H. B. SMITH.
METHOD OF FORMING BOX SHELLS.
APPLICATION FILED APR. 21, 1915.
1,152,359.  Patented Aug. 31, 1915.
2 SHEETS—SHEET 1.
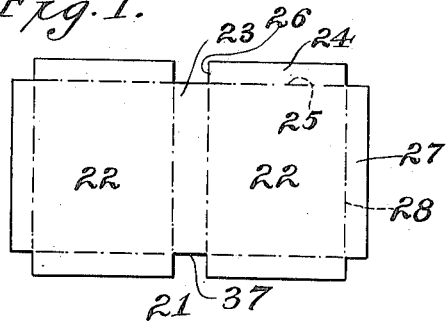
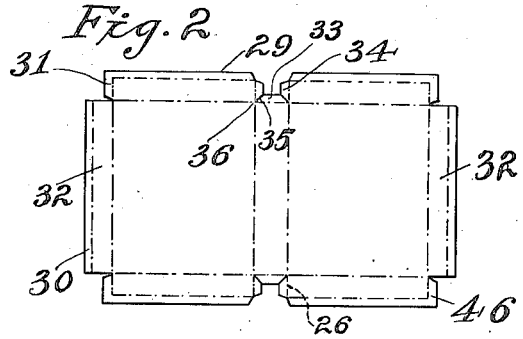
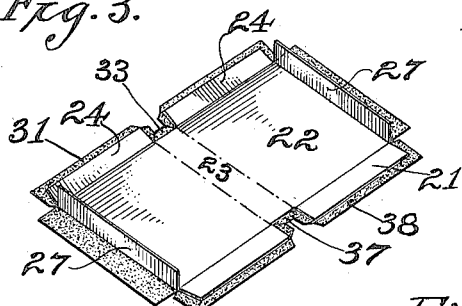
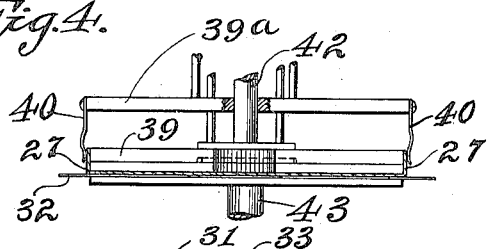
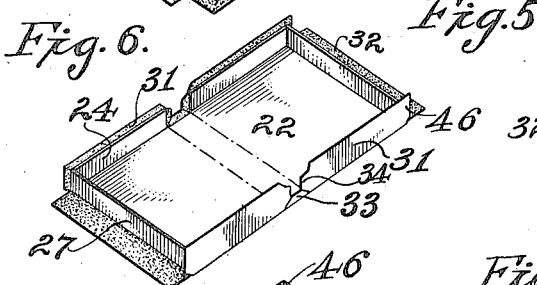
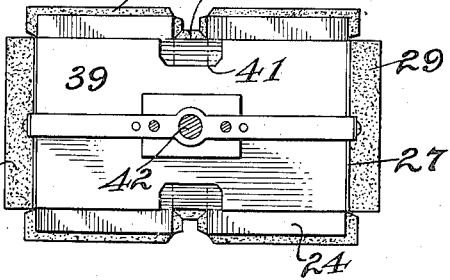
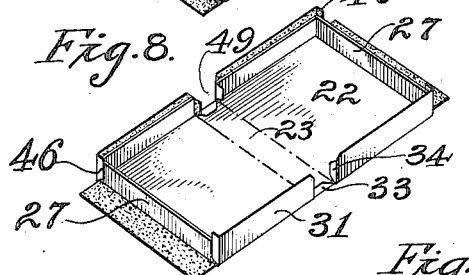
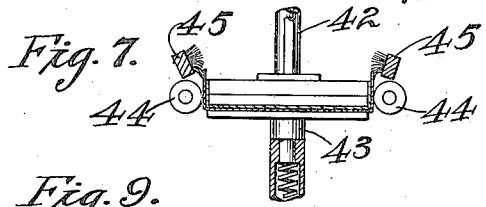
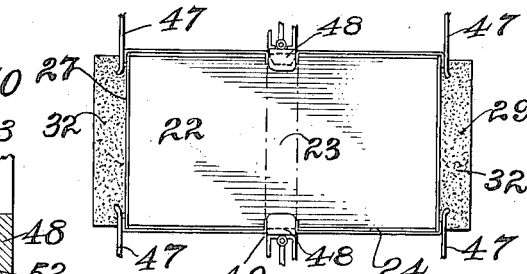
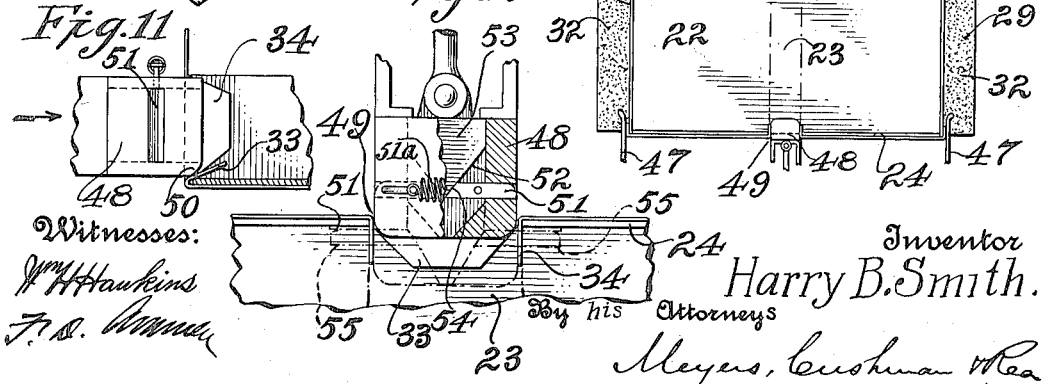
Witnesses:
Wm H Hawkins
F. S. Unnur
Inventor
Harry B. Smith.
By his Attorneys
Meyers, Cushman & Rea H. B. SMITH.
METHOD OF FORMING BOX SHELLS.
APPLICATION FILED APR. 21, 1915.
1,152,359.
Patented Aug. 31, 1915.
2 SHEETS—SHEET 2.
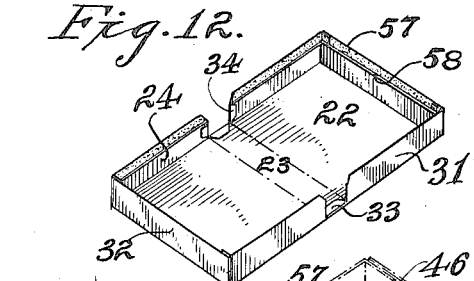
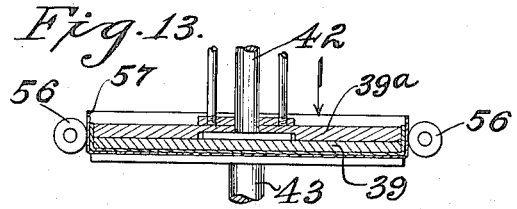
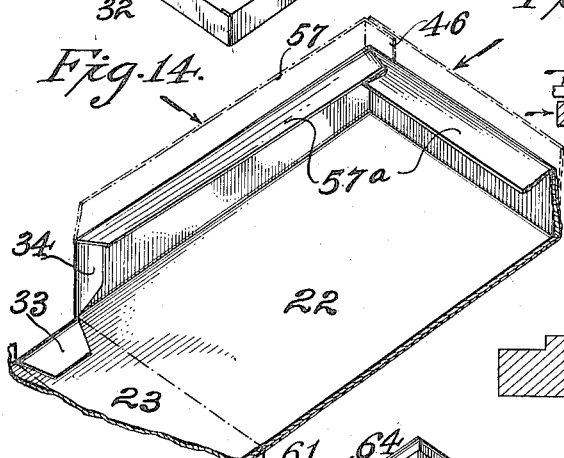
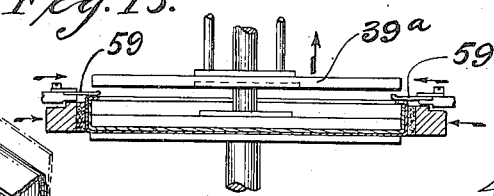
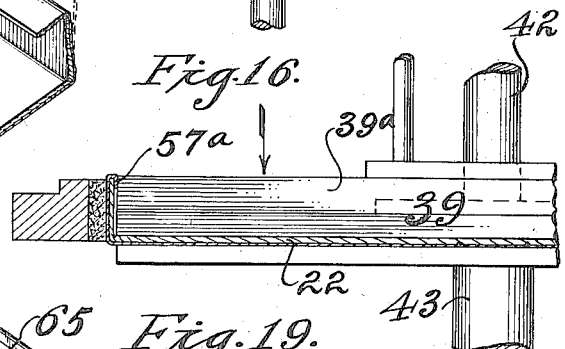
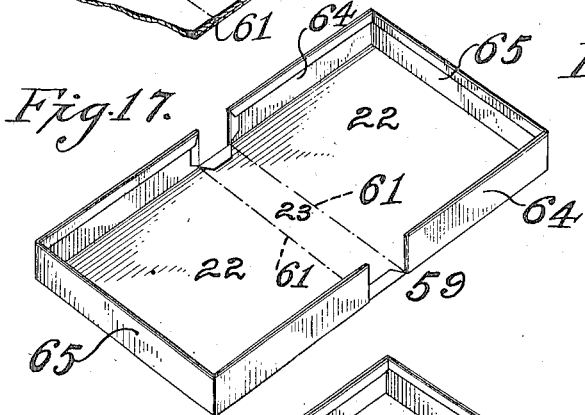
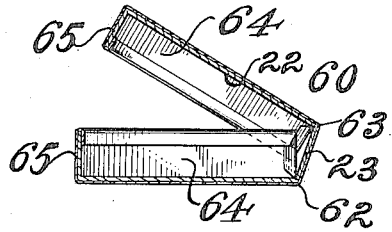
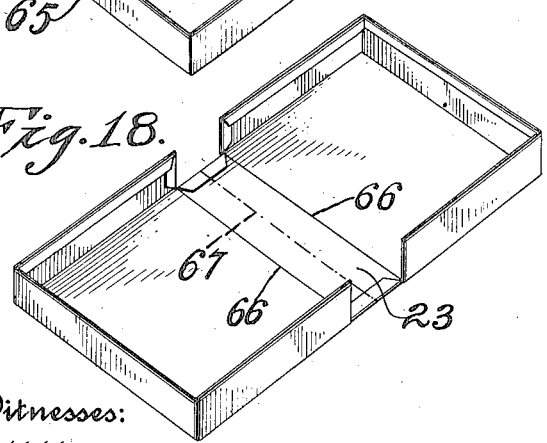
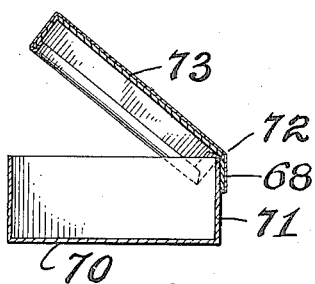
Witnesses:
Wm H Hawkins
Inventor
Harry B. Smith.
By his Attorneys
Meyers, Cushman & Rea

UNITED STATES PATENT OFFICE.

HARRY B. SMITH, OF BROOKLYN, NEW YORK.

METHOD OF FORMING BOX-SHELLS.

1,152,359.   Specification of Letters Patent.   Patented Aug. 31, 1915.

Application filed April 21, 1915. Serial No. 22,758.

*To all whom it may concern:*

Be it known that I, HARRY B. SMITH, a citizen of the United States, residing at Brooklyn, in the county of Kings and State of New York, have invented new and useful Improvements in Methods of Forming Box-Shells, of which the following is a specification.

This invention relates to the manufacture of boxes, and particularly to covered cardboard boxes such as used for commodities of any kind.

A principal object of the invention is to provide a very simple and effective method for producing a box shell in a form which is extremely useful in box manufacturing.

My improved method is particularly useful in producing boxes having hinged lids, and according to my method I produce an element or shell which can be used for making different types of hinge-lid boxes.

Further objects of the invention will appear more clearly hereinafter.

The invention consists in the method to be described hereinafter and illustrated in the accompanying drawing, and the broad scope of the invention is pointed out in the appended claims.

In the drawing, which fully illustrates the preferred embodiment of my invention, Figure 1 is a plan showing the preferred form of the boxboard blank for carrying out my method. Fig. 2 is a view similar to Fig. 1, but showing the preferred form of cover blank which may be used in practising my invention, and showing the same superposed upon a boxboard blank indicated in dotted outline and having the form shown in Fig. 1. Fig. 3 is a perspective illustrating the first step in the preferred embodiment of my method of forming the box shell from the blanks. Fig. 4 is a diagrammatic view showing the first step of the method and indicating the manner in which this step is performed in a box machine. Fig. 5 is a plan of the parts shown in Fig. 4 and further illustrating the manner in which the method may be carried out if the box shell is formed by machinery. Fig. 6 is a perspective showing the next step in the method, and Fig. 7 is a corresponding view showing the manner in which this step may be performed in a box machine. Fig. 8 is a perspective illustrating the next step in the preferred method, and Fig. 9 is a corresponding plan view illustrating the performance of the step of the method illustrating Fig. 8. Fig. 10 is a plan upon an enlarged scale, and particularly illustrating details of the method of applying the cover blank to the box board blank. In this view only a portion of the side of the box shell is illustrated, and parts of the view are broken away and shown in cross-section. Fig. 11 is a side elevation further illustrating the preferred method of applying the cover blank to the box shell. Fig. 12 is a perspective showing the box shell ready to have the marginal edge of the cover tucked in around the edges of the box shell, and Fig. 13 is a corresponding view showing the manner in which the ends of the cover blank are folded into the condition in which they are illustrated in Fig. 12. Fig. 14 is a perspective showing a portion of the box shell nearly completed and showing the marginal edges folded in and ready to be tucked down against the edges of the box shell. Fig. 15 is a corresponding view illustrating this step of folding in the marginal edges of a cover on the cardboard box shell. Fig. 16 is a view further illustrating the step of tucking in the marginal edges of a cover on the cardboard box shell. Fig. 17 is a perspective showing a box shell produced according to my method and particularly adapted for forming a hinge-lid box without the addition of other parts. Fig. 18 is a view similar to Fig. 17, but illustrating a box shell also produced according to my method but particularly adapted for forming hinge-lids of boxes. Fig. 19 is a vertical section through a partly open box illustrating the form of box which is readily produced from the box shell illustrated in Fig. 17. Fig. 20 is a vertical section similar to Fig. 19, but illustrating a box having a hinge-lid such as would be formed from the box shell illustrated in Fig. 18.

In carrying out my invention I prefer to produce a boxboard blank 21 (see Fig. 1), which blank preferably consists of two substantially rectangular body portions 22 connected by an integral web 23, the side edges of the said body portions 22 being provided with side wings 24 which are adapted to fold up at the points indicated by the line 25, (which may represent score lines) so as to form the side walls of the box shell. These side wings terminate at the web 23 and preferably present edges 26 at this point, which are preferably at right angles to the longitudinal axis of the blank. The ends of the blank are preferably provided with end wings 27 which are adapted to fold up at the point indicated by the dotted lines 28 (which may represent score lines) so as to form the end walls of the box shell. According to my method I also prefer to produce a cover blank 29 (see Fig. 2), which cover blank conforms substantially in outline to the outline of the boxboard blank. When the blanks are superposed in alinement in this way (see Fig. 2), the cover blank presents marginal edges 30 which project beyond the edges of the board blank. To be more specific, the cover blank has side wings 31 and end wings 32 which lie under the corresponding wings of the other blank. The side wings of the cover blank, like the side wings 24 of the boxboard blank, are disposed in pairs which are separated at the web 23. Near its middle portion, the cover blank is provided with tuck-in flaps 33 and at the adjacent ends at the side wings 31 tuck-in flaps 34 are provided. These tuck-in flaps project beyond corresponding edges of the corresponding parts of the boxboard blank and the tuck-in flap 33 on each side of the blank is separated from the adjacent tuck-in flaps 34 preferably by diagonal cuts or slits 35 which extend outwardly from the points 36, at which the edges 26 of the boxboard blank meet the side edges 37 of the web 23. In producing a covered box shell from blanks of this form I prefer to completely cover the face of the cover blank with an adhesive, such as glue, indicated at 38 in Fig. 3. When the boxboard blank is superposed on the cover blank and in alinement therewith, as illustrated in Fig. 2, I then proceed to form the box shell and preferably cover the same simultaneously by folding up the wings of the cover blank. In accomplishing this I prefer to fold up the end wings 27 of the cover blank by any suitable means and hold these wings up against the ends of the form block 39 in any suitable manner, such as by means of the spring clips 40 on the upper part 39ª of the form block. The middle portion of the form block is preferably cut with recesses 41 on opposite sides.

After folding up the end wings 27 the side wings 24 of the board blank and the side wings 31 of the cover blank are preferably folded up simultaneously. This may be accomplished in the box machine in the manner illustrated in Fig. 7 by means of the plunger 42 which presses the unformed box against a spring pressed receding platen 43 so that the box passes down between the presser rollers 44 and wipers 45 which fold up the flaps to produce side walls of the box shell. This same movement of course smooths the cover wings against the boxboard wings and causes them to adhere. This results in giving the unformed box the shape shown in Fig. 6. It will be seen that the ends of the side wings of the cover blank project beyond the outer ends of the side wings of the box blank so that end laps 46 are formed, and these end laps are then folded against the outer side of the end walls 27, preferably as shown in Fig. 8. At the same time I fold in the tuck-in flaps 33 so that they come against and adhere to the side edge and upper faces of the web 23 at the sides of the blank. This is readily accomplished in a box machine by means of end tuck-in wings 47 (see Fig. 9) which move in across the ends of the box.

The tuck-in flaps 33 at both sides of the box are preferably simultaneously folded in at the same time that the end tuck-in fingers 47 move inwardly. This may be accomplished in the machine by means of a folding block 48 which is moved inwardly through the gap 49 in the side walls of the box shell. The lower forward edge 50 (see Fig. 11) of the block strikes the upstanding tuck-in flap 33 which is in a vertical position, and folds the flap over and down onto the side edge of the boxboard blank. After the block 48 has moved inwardly a sufficient distance through the plane of the side walls of the unformed box shell, side tuck-in members 51 operate to tuck in the tuck-in flaps 34. These tuck-in members or fingers 51 may be mounted to slide in the block 48 and may be moved outwardly by inclined faces 52 on an inner block 53 which moves in after the block 48 has come to rest. When the inner block 53 comes forward its inclined faces 52, which lie against the inclined inner ends 54 of the fingers 51, force them outwardly and their forward ends 55 bend over the flaps 34 and cause them to become secure to the end edges of the side wings 24 of the boxboard blank at the gaps 49. The blocks 48 and 53 then withdraw, fingers 51 being retracted by a spring 51ª which connects them. The end wings 32 of the cover blank are then folded up against the end wings of the box blank. This is accomplished very readily by means of presser rollers 56, between which the form and the box are carried, after which the partly formed box will present the appearance illustrated in Fig. 12; it will have a continuous unfolded marginal edge 57 on the cover extending along the upper or marginal edge 58 of the box shell. The next operation is simply to tuck in the edge 57 all around the edge 58. This is accomplished preferably as illustrated in Figs. 14 and 15; folding fingers 59 move inwardly over the upper edge of the box shell so as to fold the margin 57 downwardly into the horizontal position indicated at 57ª in Fig. 14, and this horizontal projecting margin 57ª is then folded down into the interior of the box so as to engage all around the edge of the box by means of the upper portion 39ᵃ of the block 39. This block moves down into the interior of the box as shown in Fig. 16, and then withdraws, the box being stripped from the block 39 in any suitable manner.

The box shell illustrated in Fig. 17 is produced in this way. If the box shell 59 shown in Fig. 17 is to be used for forming a hinge-lid box 60, such as shown in Fig. 19, the box shell is then folded on the transverse score lines 61 which are located at the point of junction between the web 23 and the body portions 22 of the board blank. By folding the box in this way these score lines 61 form hinge lines 62 and 63 in the finished box, and the finished side walls 64 and end walls 65 of the box shell may overlap or telescope with each other as illustrated in Fig. 19. If desired one of the body portions 22 may be made slightly larger than the other so that the portions of the box will telescope neatly together when folded as suggested.

A box shell such as illustrated is also very useful in forming hinge lids for ordinary open boxes. In this case, however, in addition to the pair of score lines 66 (see Fig. 18) I prefer to provide an intermediately located score line 67 extending transversely on the middle of the connecting web 23, and after the open box shell is completely formed I divide it into two shells on the line 67. In this way I form two complete lids with integral connected hinge flaps, such as the hinge flap 68 (see Fig. 20). This view illustrates how one of these two covers formed from such a box shell, may be attached to an ordinary open box 70 simply by securing the back flap or hinge flap 68 to the upper edge of the rear wall 71 of the box. The score lines 66 form a hinge line 72 for enabling the box lid to be swung open and closed. In order to make the box lid 73 close neatly it should, of course, be slightly larger in certain dimensions than the box 70 to which the lid is attached.

It is understood that the embodiment of the invention set forth herein is only one of the many embodiments or forms the invention may take, and I do not wish to be limited in the practice of the invention nor in my claims to the particular embodiment set forth.

What I claim is:

1. The method herein described of making a box shell which consists in producing a board blank having two substantially rectangular body portions connected by an integral transverse web, said body portions having integral end wings and integral side wings terminating at separated points adjacent said web to form gaps in the side walls of the box shell, producing a cover blank superposable on said box blank with marginal edges projecting beyond the edges of said box blank, superposing said blanks in alinement with each other, folding up the end wings and the side wings of said box blank to form an open box shell from said box blank with gaps in the middle of the side walls thereof, simultaneously folding and securing the cover blank to the box shell to envelop the box shell and maintain the same in its shell form, and securing the edges of said cover at the edges of the gaps in said side walls.

2. The method herein described of making a box shell which consists in producing a board blank having two substantially rectangular body portions connected by an integral transverse web, said body portions having integral end wings and integral side wings terminating at separated points adjacent said web to form gaps in the side walls of the box shell, producing a cover blank superposable on said box blank with marginal edges projecting beyond the edges of said box blank, superposing said blanks in alinement with each other, folding up the end wings and the side wings of said box blank to form an open box shell from said box blank with gaps in the middle of the side walls thereof, simultaneously folding and securing the cover blank to the box shell to envelop the box shell and maintain the same in its shell form, and tucking in and securing the edges of said cover to the edges of said web and to the edges of said side wings at said gaps.

3. The method herein described of making a box shell which consists in producing a board blank having two substantially rectangular body portions connected by an integral transverse web, scoring said blank transversely at said web to produce folding lines in the box shell to enable the box shell to hinge on said web, said body portions having integral end wings and integral side wings terminating at separated points adjacent said web to form gaps in the side walls of the box shell, producing a cover blank superposable on said box blank, with marginal edges projecting beyond the edges of said box blank, superposing said blanks in alinement with each other, folding up the end wings and the side wings of said box blank to form an open box shell from said box blank with gaps in the middle of the side walls thereof, simultaneously folding and securing the cover blank to the box shell to envelop the box shell and maintain the same in its shell form, and securing the edges of said cover at the edges of the gaps in said side walls.

4. The method herein described of making a box shell which consists in producing a board blank of substantially rectangular form, having integral end wings and a pair of integral side wings, said side wings terminating and having separated edges near the middle point of said blank, producing a cover blank superposable on said box blank with the marginal edges thereof projecting beyond the edges of said box blank, superposing said blanks in alinement with each other, folding up the end wings and the side wings of said box blank to form an open box shell from said box blank, folding and securing the cover blank to the box shell to envelop the box shell and maintain the same in its shell form, tucking in and securing the edges of said cover to the edge of said blank and to the said edges of said side wings.

5. The method herein described of making a box shell which consists in producing a board blank of substantially rectangular form having integral end wings and a pair of integral side wings, said side wings terminating and having separated edges near the middle point of said blank, folding up said end wings and said side wings to form the end walls and side walls of the box shell, scoring said board blank transversely adjacent said separated edges to form hinge lines in the box shell and applying a cover to the box shell.

6. The method herein described of making a box shell which consists in producing a board blank having two substantially rectangular body portions with an integral connecting web, one of said body portions being slightly larger than the other, said body portions having integral end wings and integral side wings terminating and having separated edges adjacent said web to form gaps in the side walls of the box opposite said web, producing a cover blank superposable on said box blank with tuck-in flaps projecting beyond the edges of the box blank adjacent said web, superposing said blanks in alinement with each other, folding up the end wings and the side wings of said blank to form an open box shell from said box blank with gaps in the middle of the side walls thereof, folding the cover blank to envelop the box shell and maintain the same in shell form, and tucking in and securing the edges of said cover to the edges of said side walls at said gaps and tucking in and securing the edges of said cover to the side edges of said web at said gaps.

In testimony whereof I have hereunto set my hand in presence of two subscribing witnesses.

HARRY B. SMITH.

Witnesses:
ALFRED H. CRANKSHAW,
EWIRD NEUHUT.